United States Patent
Van Eeden et al.

(10) Patent No.: US 8,628,330 B2
(45) Date of Patent: Jan. 14, 2014

(54) SAFETY SYSTEM FOR EQUIPMENT

(76) Inventors: Christiaan Hieronymans Bornman Van Eeden, Eldoraigne Centurion (ZA); George Oliver Fourie, Moreleta Park Pretoria (ZA)

(*) Notice: Subject to any disclaimer, the term of this patent is extended or adjusted under 35 U.S.C. 154(b) by 770 days.

(21) Appl. No.: 12/311,867

(22) PCT Filed: Oct. 15, 2007

(86) PCT No.: PCT/IB2007/054192
§ 371 (c)(1),
(2), (4) Date: Aug. 9, 2010

(87) PCT Pub. No.: WO2008/047296
PCT Pub. Date: Apr. 24, 2008

(65) Prior Publication Data
US 2010/0298956 A1    Nov. 25, 2010

(30) Foreign Application Priority Data
Oct. 19, 2006  (ZA) .................................. 2006/08726

(51) Int. Cl.
*G09B 7/00*  (2006.01)
(52) U.S. Cl.
USPC ........................................................... 434/219
(58) Field of Classification Search
USPC ................................................. 434/219, 365
See application file for complete search history.

(56) References Cited

U.S. PATENT DOCUMENTS

| | | | |
|---|---|---|---|
| 5,730,720 A * | 3/1998 | Sites et al. | 604/27 |
| 6,154,673 A * | 11/2000 | Morgan et al. | 607/5 |
| 6,994,258 B2 * | 2/2006 | Lewis | 235/472.01 |
| 2003/0014779 A1 | 1/2003 | Drotning | |
| 2003/0149513 A1 | 8/2003 | Muragishi | |
| 2004/0135670 A1 | 7/2004 | Guba | |
| 2004/0230329 A1 | 11/2004 | Schwesig | |
| 2007/0004381 A1* | 1/2007 | Larson et al. | 455/411 |

OTHER PUBLICATIONS

International Search Report for PCT/IB2007/054192, mailed Jun. 19, 2008.
International Preliminary Report on Patentability for PCT/IB2007/054192, mailed Oct. 16, 2008.

* cited by examiner

*Primary Examiner* — Kathleen Mosser
(74) *Attorney, Agent, or Firm* — Nizon & Vanderhye PC

(57) ABSTRACT

Apparatus (10) for promoting safe handling of equipment (12) comprises a display (14) for displaying a safety check relating to a prospective user's competency to use the equipment (12). A user manipulatable arrangement (20) enables the prospective user to enter data in response to the check. A controller (16) connected to the arrangement (20) is configured to operate a switch (24) to inhibit switching on or starting of the equipment, should the response data entered not meet with a predetermined criterion.

5 Claims, 4 Drawing Sheets

1

SAFETY SYSTEM FOR EQUIPMENT

Figure 1:
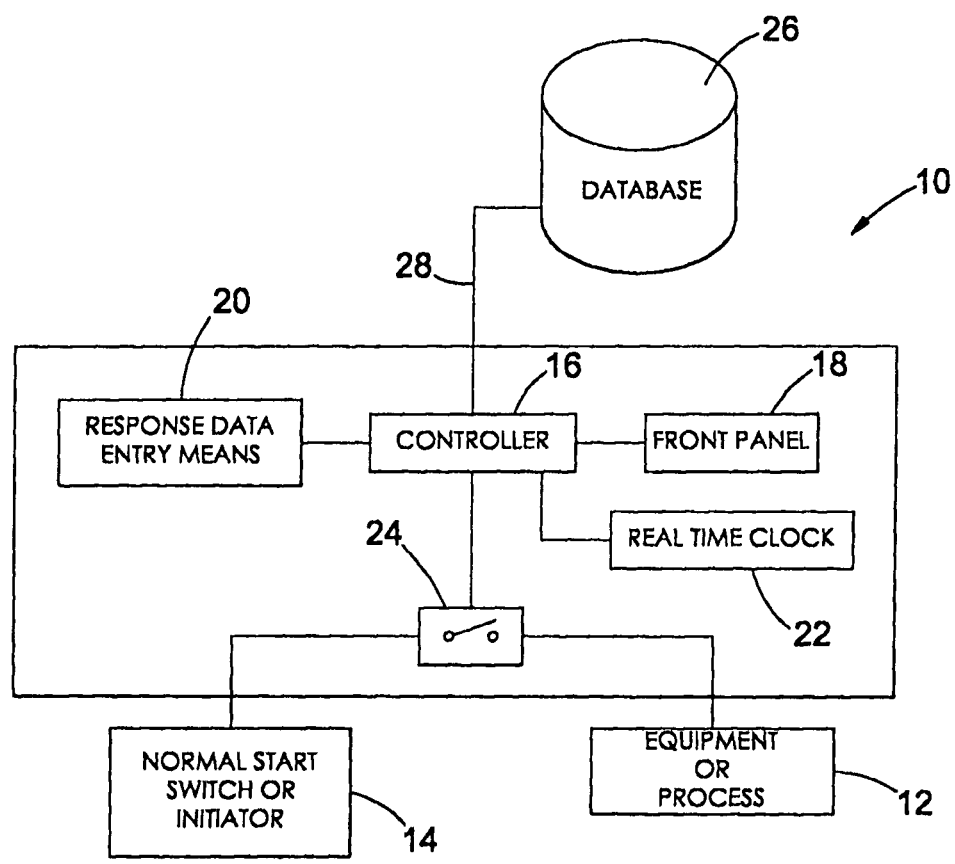

This application is the U.S. national phase of International Application No. PCT/IB2007/054192, filed 15 Oct. 2007, which designated the U.S. and claims priority to South African Application No. 2006/08726 filed 19 Oct. 2006, the entire contents of each of which are hereby incorporated by reference.

INTRODUCTION AND BACKGROUND

This invention relates to apparatus for and a method of promoting safe handling or operating of potentially dangerous equipment.

In an industrial or mining environment, it often happens that a person not suitably skilled and/or trained, has access to equipment such as a grinder, lathe, mobile electric or diesel equipment, conveyors or the like, which may be dangerous to the user and/or bystanders. In the event of an accident or incident, disputes may arise whether the user was authorized and/or qualified and/or declared competent to use the equipment. With the current systems and methods it is often very difficult and even impossible to resolve these factual disputes. This places undue responsibility on supervisors and persons that are legally responsible for the safe operation of equipment. The most commonly found control measures implemented by employers to prevent injury, comprise administrative steps and controls such as safe work procedures, training and symbolic signs, such as for the compulsory use of protective gear. Past experience has proven that, because of the risk-taking nature and behaviour of humans, administrative control measures are not sufficient and hence there is a need for more effective control systems to ensure the safe handling of equipment, more particularly to ensure legal compliance, as well as compliance with employer/company policies and procedures. Safe working procedures are often forgotten or not properly applied after a period of time by the operators. It is difficult, time-consuming and costly regularly to remove operators from their posts for retraining and refresher sessions.

OBJECT OF THE INVENTION

Accordingly, it is an object of the present invention to provide apparatus for and a method of promoting safe handling of potentially dangerous equipment with which the applicant believes the aforementioned disadvantageous may at least be alleviated.

SUMMARY OF THE INVENTION

According to the invention there is provided apparatus for promoting operation of equipment, the apparatus comprising:
  a display for displaying a safety check relating to at least one of a prospective user's competency to use the equipment, a safe condition of the equipment, and a environment within which the equipment is to be operated;
  a user manipulatable arrangement for enabling the prospective user to enter data in response to the check; and
  a controller connected to the arrangement for inhibiting switching on or starting of the equipment, should the response data not meet with a predetermined criterion.

The controller may be connected to operate one of a conventional start switch of the equipment and a special switch connected in series with the conventional start switch of the equipment and a power supply, thereby to inhibit switching on of the equipment, should the response data not meet with the criterion.

The safety check may comprise a plurality of qualifying statements and/or questions and the display may comprise a front panel of the apparatus comprising a plurality of fields, each field displaying a respective qualifying statement or question.

The qualifying statement or question may be printed in the fields in a human readable form and the user manipulatable arrangement may comprise at least one switch associated with each of the fields.

In another embodiment, the display may comprise an electronic display connected to the controller and the controller may be configured to cause the statements and/or questions to be displayed in sequential manner in a first field of the display.

In this embodiment the user manipulatable arrangement may comprise a keypad and the keypad may comprise a first switch and a second switch, associated with a second and a third field on the display, respectively.

The apparatus may further comprise means for identifying the prospective user.

The means for identifying the prospective user may comprise an RFID system comprising an RFID transponder associated with and/or carried by the prospective user and a reader of the system connected to the controller.

The apparatus may comprise a database for storing the response data entered by the prospective user as well as the ID data of the prospective user.

Also included within the scope of the present invention is a method of automatically controlling user access to equipment or a process, the method comprising the steps of:
  prompting a prospective user electronically to enter response data to a safety check relating to at least one of the prospective user's competency to use the equipment or process, a safe condition of the equipment, and a safe environment within which the equipment or process is to be used;
  receiving the response data and electronically comparing the response data to date relating to a predetermined criterion; and
  if the response data does not meet with the criterion, inhibiting switching on of the equipment or access to the process.

The method may also include the step of automatically identifying the prospective user before the user is prompted, alternatively while the user is prompted, further alternatively after the user has entered the response data.

The method may include the step of storing the response data entered and the ID data.

BRIEF DESCRIPTION OF THE ACCOMPANYING DIAGRAMS

Figure 2:
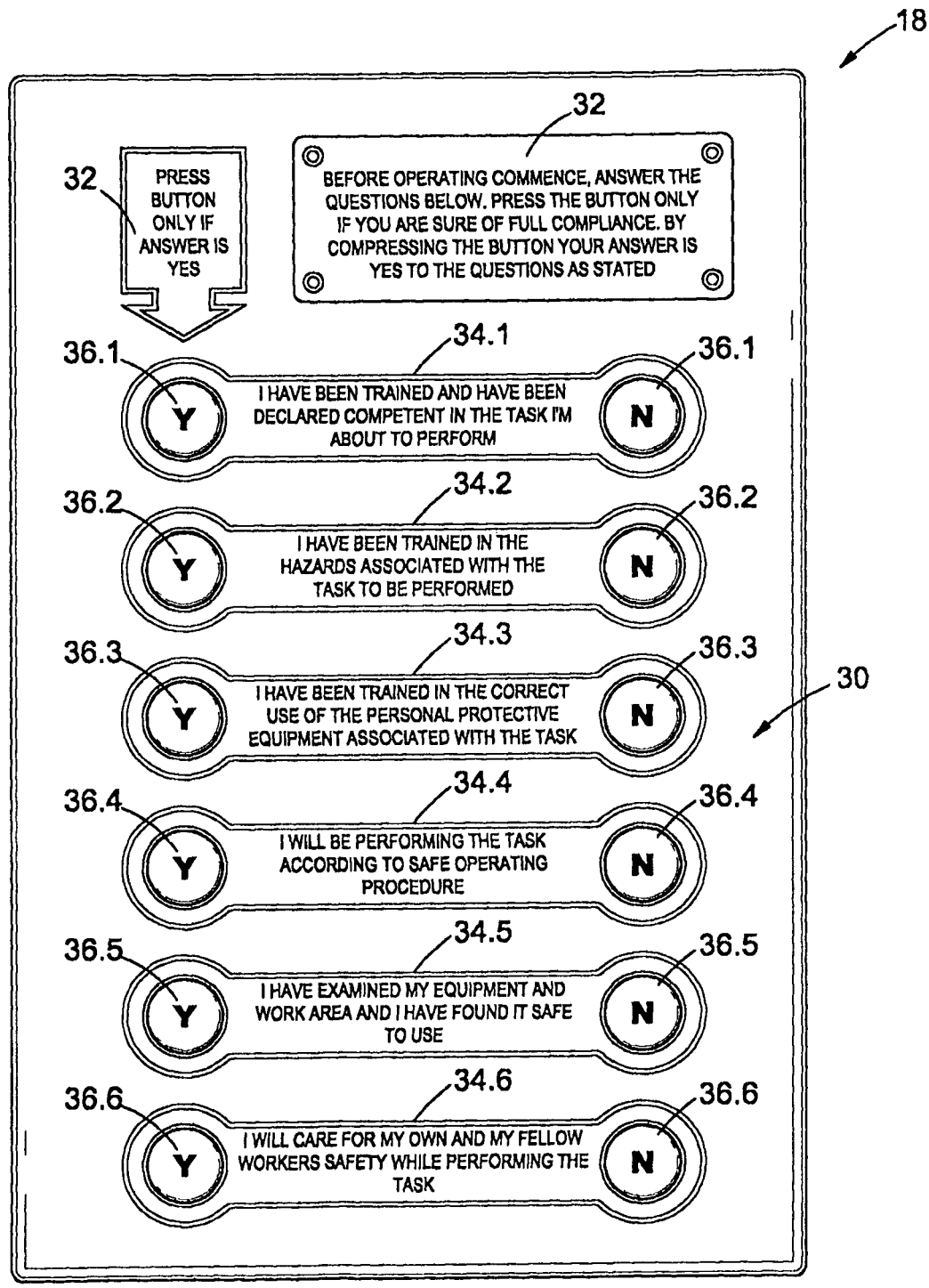
Figure 3:
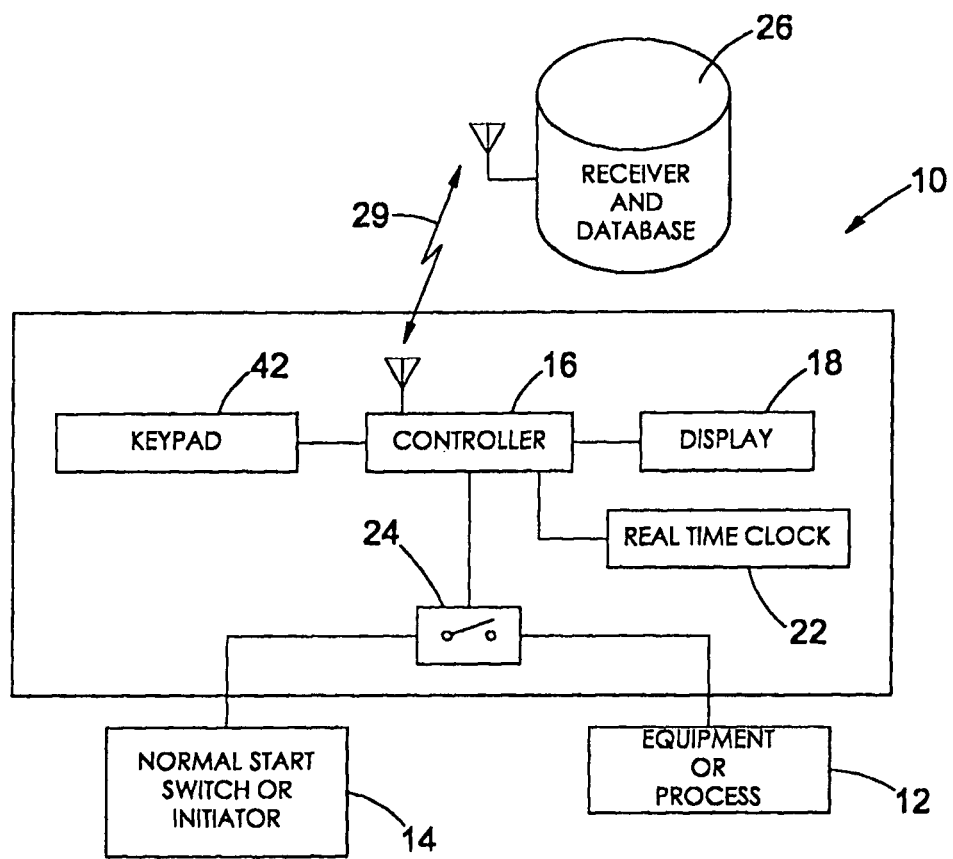
Figure 4:
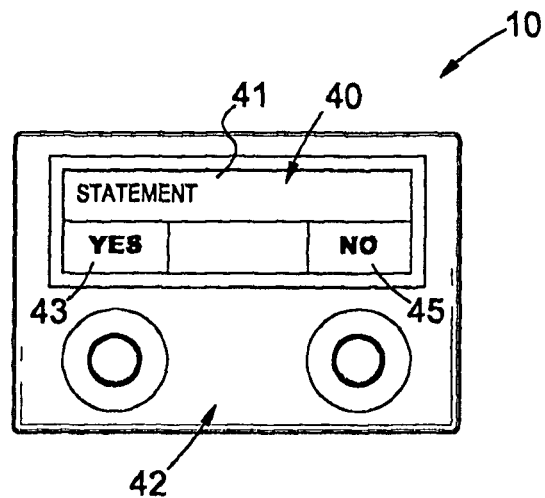
Figure 5:
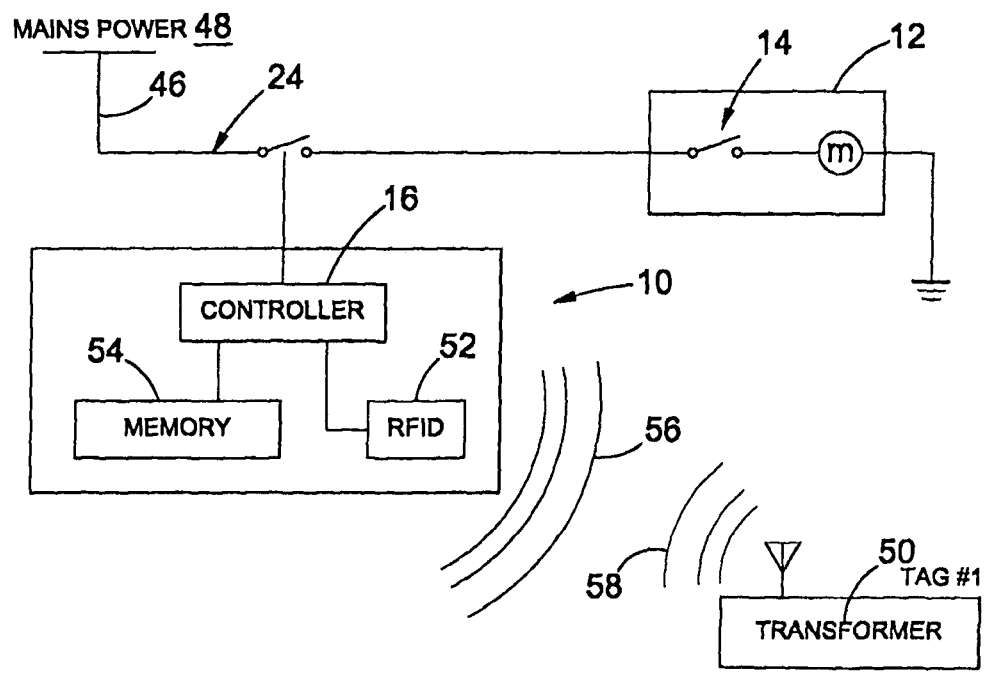

The invention will now further be described, by way of example only, with reference to the accompanying diagrams wherein:
  FIG. 1 is a block diagram of apparatus according to the invention;
  FIG. 2 is a diagrammatic view of a front panel of the apparatus in FIG. 1;
  FIG. 3 is a block diagram of an alternative embodiment of the apparatus according to the invention;
  FIG. 4 is a diagrammatic view of a front panel of the embodiment in FIG. 4; and FIG. 5 is a block diagram of the apparatus, illustrating an alternative connection to the equipment as well as one example embodiment of means for identifying a prospective user of the equipment.

DESCRIPTION OF A PREFERRED EMBODIMENT OF THE INVENTION

Apparatus according to the invention for promoting safe handling of equipment 12 is generally designated by the reference numeral 10 in FIG. 1.

The equipment 12 comprises a conventional start switch 14 or other initiating means. The apparatus 10 is connected in series with the switch 14 of the equipment 12.

The apparatus comprises a microprocessor-based controller 16 executing an applications program. The apparatus comprises a display 18 for displaying a safety check, for example a set of qualifying statements and/or questions to a prospective user of the equipment, a user manipulatable response data entry arrangement 20 connected to the controller 16 for enabling the prospective user to enter a response, and a real time clock 22. The controller 16 is operative to control a normally open switch 24, which is connected in series with the switch 14 and the equipment 12. The controller 16 may comprise a local database (not shown) and/or may be connected to a remote database 26.

One example embodiment of the display 18 for displaying a safety check in the form of a set of statements and/or questions to a prospective user of the equipment 12, is shown in FIG. 2. The display comprises a user interface in the form of a front panel 30. The front panel 30 comprises a first zone 32 wherein instructions for a prospective user are permanently displayed, in the form of printed matter. A set of statements for the prospective user is also permanently displayed in human readable form in fields 34.1 to 34.6, to determine his/her qualification to use the equipment. Associated with each statement 34.1 to 34.6, there are provided respective "yes" and "no" button pairs 36.1 to 36.6 of the response data entry arrangement 20, to enable the prospective user, to enter a response to the respective statement.

Should the user provide response data via the button pairs 36.1 to 36.6 which meets with a predetermined criterion, the controller is configured to close switch 24, thereby to enable a so determined qualified prospective user to switch the equipment 12 on, utilizing the conventional start switch 14. However, if the response data does not meet with the criterion, the switch 24 remains open, thereby inhibiting switching on of the equipment 12 by a so determined unqualified prospective user.

The criterion may be management selectable and variable, more particularly programmable.

In FIGS. 3 and 4, there is shown a second example embodiment of the apparatus according to the invention. This embodiment is similar to the embodiment in FIG. 1, except that the means for displaying the safety check comprises an electronic display 40, such as an LCD or plasma or any other suitable display. A keypad 42 comprising at least one user actuable button, but preferably a pair, for entering response data is connected to the controller 16.

In this embodiment the controller 16 is configured sequentially to display in first field 41 of display 40 a statement from a set of statements stored in a memory arrangement of the controller and the user is then invited by prompts in second and third fields 43 and 45 respectively to enter a "yes" or "no" response via keypad 42. It will be appreciated that the controller 16 may scroll through a plurality of programmable statements and may prompt the prospective user to enter a respective response to each of the statements. The controller 16 is configured, if a pre-programmed criterion for the responses is met, to close switch 24. If not, the switch 24 remains open, thereby preventing the unqualified user to switch the equipment 12 on, or to access the process. It will be appreciated that with this embodiment, the statements and/or questions and/or criterion may be programmable, either remotely or locally. Programming may be via a network, alternatively wirelessly.

The database 26 may comprise a local memory arrangement (shown at 54 in FIG. 5) of the controller 16. Alternatively, or in addition, it may comprise a remote database 26 (see FIGS. 1 and 3) which is in data communication with the controller via a hardwired or optical cable network, alternatively via a wireless link 29. In use, data relating to an event, such as the response data entered by a prospective user is captured, time stamped with data from the real time clock 22, and stored in the database. The stored data may subsequently be retrieved, to determine or investigate the qualification and/or authority of the user to have used the equipment.

In FIG. 5 there is shown an alternative connection of the apparatus 10 to the equipment. In this embodiment the apparatus 10 is connected in a cable 46 extending between mains power 48 and the equipment 12, as opposed to being integrated in the equipment or housing therefore.

The apparatus 10 may also comprise means for determining the identity of the prospective user. Such means may comprise a radio frequency identification (RFID) system comprising a transponder or tag 50 associated with the prospective user, and a reader 52 connected to or associated with the controller 16. In use, the reader transmits an interrogation signal 56 and the transponder automatically responds with a response signal 58 comprising ID data relating to the transponder, and hence the user. The ID data is captured and stored in the database together with the response data entered as hereinbefore described. In another embodiment, the controller 16 may be configured to prompt the prospective user to enter an ID code via the keypad 42, before questions or safety checks are displayed.

The check may comprise n qualifying statements and/or questions and the statements may be divided into m classes. A first class may comprise statements relating to legal and/or regulatory requirements, a second class may comprise statements relating to other company or management requirements and a third class may comprise statements relating to pre-use check steps and/or measures. Referring to FIG. 2, the statements may include, but are not limited to:

a) I have been trained and have been declared competent in the task I'm about to perform
b) I have been trained in the hazards associated with the task to be performed
c) I have been trained in the correct use of the personal protective equipment associated with the task
d) I will be performing the task according to safe operating procedure
e) I have examined my equipment and work area and I have found it safe to use
f) I will care for my own and my fellow workers' safety, while performing the task each requiring consideration by the prospective user and then to enter response data in the form of a "yes" or "no", both of which are valid responses and acceptable. The controller 16 is configured to compare the response data entered and received against a predetermined criterion, and if the data does not meet with the criterion, the controller inhibits switching on of the equipment either by preventing the conventional start switch of the equipment to be closed or by not closing a second switch 12 connected in series with the conventional switch 14 and a power supply, such as mains power 48.

It will be appreciated that the text statements or questions may be replaced or amplified with suitable symbols and/or diagrams.

The apparatus may further comprise a lockout mechanism, enabling an authorized user, once the equipment has been switched on or the process has been accessed by the authorized user, to lock the equipment out from use by another prospective user, until unlocked by the authorized user. The ID of the authorized user and other attempting users are determined by the aforementioned means for determining the ID of a prospective user.

The invention claimed is:

1. An apparatus for promoting safe operation of equipment, the apparatus comprising:
   a display for displaying a safety check relating to at least one of a prospective user's competency to use the equipment, a safe condition of the equipment, and a safe environment within which the equipment is to be operated;
   the safety check comprising a plurality of qualifying statements and the display comprising a front panel of the apparatus comprising a plurality of fields, each field displaying a respective qualifying statement which is printed in the fields;
   means for determining identification data relating to the prospective user;
   a user manipulatable arrangement for enabling the prospective user to enter data in response to the check;
   the user manipulatable arrangement comprising at least one switch associated with each of the fields;
   a controller connected to the arrangement for Inhibiting switching on or starting of the equipment, should the response data not meet with a predetermined criterion; and
   a database for storing identification data relating to the prospective user and the response data entered by the prospective user.

2. The apparatus as claimed in claim 1 wherein the controller is connected to operate one of a conventional start switch of the equipment and a special switch connected in series with the conventional start switch of the equipment.

3. The apparatus as claimed in claim 1 wherein the means for identifying the prospective user comprises an RFID system comprising an RFID transponder associated with the prospective user and a reader of the system connected to the controller.

4. A method of automatically controlling user access to equipment or a process, the method comprising the steps of;
   prompting a prospective user electronically to enter response data to a safety check relating to at least one of the prospective user's competency to use the equipment or process, a safe condition of the equipment or process and a safe environment within which the equipment or process is to be used;
   receiving the response data and electronically comparing the response data to data relating to a predetermined criterion;
   if the response data does not meet with the criterion, inhibiting switching on of the equipment or access to the process;
   determining identity data relating to the prospective user;
   storing in a database the identity data relating to the prospective user and the response data entered; and
   once the equipment has been switched on or the process has been started by a qualifying user, enabling the qualifying user to lock-out other prospective users from using the equipment or process.

5. The method as claimed in claim 4 comprising the step of automatically identifying the prospective user.

* * * * *